US008091889B2

(12) United States Patent
Muranaka et al.

(10) Patent No.: US 8,091,889 B2
(45) Date of Patent: Jan. 10, 2012

(54) THICKNESS DETECTOR OF PAPER

(75) Inventors: Mitsuhiko Muranaka, Hyogo (JP); Kazuhito Ogawa, Hyogo (JP)

(73) Assignee: Glory Ltd., Himeji-shi (JP)

( * ) Notice: Subject to any disclaimer, the term of this patent is extended or adjusted under 35 U.S.C. 154(b) by 0 days.

(21) Appl. No.: 12/675,625

(22) PCT Filed: Aug. 31, 2007

(86) PCT No.: PCT/JP2007/067468

§ 371 (c)(1),
(2), (4) Date: Feb. 26, 2010

(87) PCT Pub. No.: WO2009/028109

PCT Pub. Date: Mar. 5, 2009

(65) Prior Publication Data

US 2010/0301551 A1 Dec. 2, 2010

(51) Int. Cl.
*B65H 7/02* (2006.01)
*G06K 9/00* (2006.01)

(52) U.S. Cl. ............... 271/265.02; 271/265.01; 382/135

(58) Field of Classification Search ............. 271/265.04, 271/265.01, 264
See application file for complete search history.

(56) References Cited

U.S. PATENT DOCUMENTS

| | | | | |
|---|---|---|---|---|
| 5,406,358 | A | 4/1995 | Kimura et al. | |
| 2004/0208351 | A1* | 10/2004 | Yoshida et al. | 382/137 |
| 2005/0141759 | A1* | 6/2005 | Mori et al. | 382/135 |
| 2008/0089573 | A1* | 4/2008 | Mori et al. | 382/135 |

FOREIGN PATENT DOCUMENTS

| | | | |
|---|---|---|---|
| DE | 102004030618 | A1 | 1/2006 |
| EP | 1471470 | A1 | 10/2004 |
| EP | 1542173 | A1 | 6/2005 |
| JP | 58-219402 | A | 12/1983 |
| JP | 60-228901 | A | 11/1985 |
| JP | 04-198802 | A | 7/1992 |
| JP | 05-071945 | A | 3/1993 |
| JP | 05278887 | A * | 10/1993 |
| JP | 06-124005 | A | 5/1994 |
| JP | 06-049442 | U | 7/1994 |
| JP | 6-61850 | U | 9/1994 |
| JP | 08-184403 | A | 7/1996 |
| JP | 09-190562 | A | 7/1997 |
| JP | 10-181923 | A | 7/1998 |
| JP | 10-283520 | A | 10/1998 |
| JP | 2000-099798 | A | 4/2000 |
| JP | 2003-248852 | A | 9/2003 |
| JP | 2005-270808 | A | 10/2005 |
| JP | 2007-001739 | A | 1/2007 |
| JP | 2007001739 | A * | 1/2007 |

* cited by examiner

*Primary Examiner* — Kaitlin Joerger
(74) *Attorney, Agent, or Firm* — Foley & Lardner LLP

(57) ABSTRACT

A paper-sheet-thickness detecting device includes a reference roller provided on a fixed rotation shaft; a detection roller provided to face and come into contact with the reference roller; a detection block in which the detection roller is provided at one end and the other end is rotatably fixed around a fulcrum shaft so that the detection block is turned and displaced according to a thickness of a paper sheet passing through between the reference and detection rollers; a holding block that holds the fulcrum shaft; a first pressing member fixed to the holding block to maintain contact between the detection and reference rollers by pressing the detection block, the first pressing member being displaced according to rotation and displacement of the detection block when the paper sheet passes through between the reference and detection rollers; and a displacement detector that detects a displacement amount of the first pressing member.

12 Claims, 9 Drawing Sheets

(NO THRUST PRESSURE)

(THRUST PRESSURE IS APPLIED)

THICKNESS DETECTOR OF PAPER

TECHNICAL FIELD

The present invention relates to a paper-sheet-thickness detecting device incorporated in a banknote recognition unit in a cash handling machine installed at a bank or the like to detect thickness of banknotes.

BACKGROUND ART

In an apparatus that handles banknotes, such as a banknote recognition unit provided in a cash handling machine or the like and an automatic vending machine, it is important to recognize a banknote altered by a tape, paper or the like, and the banknote recognition unit is provided for the recognition.

The banknote altering techniques have been sophisticated particularly in recent years. For example, banknotes, securities, stamps, and checks altering by a tape, paper, or seal have been circulated.

As an example of a banknote judgment unit that authenticates banknotes or the like altered by a tape, paper or the like, there is a conventional technique described in Japanese Utility Model Application Laid-open No. H6-49442, for example.

A paper-sheet-thickness detecting device in this conventional technique is explained with reference to FIG. 11. As shown in FIG. 11, a reference roller 101 and a detection roller 102 are provided to face each other, and the detection roller 102 is attached to one end of a lever member 104 swingable vertically around a fulcrum shaft 103 by a movable shaft 105, and a douser 106 is attached to the other end of the lever member 104. An optical sensor 107 such as a photo interrupter is arranged facing to the douser 106. The lever member 104 is biased upward by a spring 108 at a position away from the movable shaft 105, putting the fulcrum shaft 103 therebetween, and the detection roller 102 is pushed down by this bias. However, the lever member 104 is locked by a locking member 109 so that a gap d between the detection roller 102 and the reference roller 101 becomes wider than a thickness t of a paper sheet P and narrower than a thickness 2*t* of two paper sheets.

Therefore, if only one paper sheet P is inserted, the movable shaft 105 does not move vertically, and there is no change in a detection result of the optical sensor 107. If two paper sheets are inserted together, the detection roller 102 is pushed upward to move the douser 106 via the lever member 104, and the detection result of the optical sensor 107 changes. The thickness of the paper sheet is detected with this configuration.

In the conventional technique, however, a setting operation of the gap d between the detection roller 102 and the reference roller 101 becomes quite difficult. Further, even if the gap d can be accurately set, the gap d may often go out of order during use.

Furthermore, in the conventional technique, the detection roller is always brought into contact with the reference roller. However, if the detection roller is always brought into contact with the reference roller, a tremor (pitching) of the detection roller occurs during passage of a paper sheet, thereby causing a problem such that the thickness cannot be detected accurately.

Further, when the paper sheet passes through between the detection roller and the reference roller, fine dust adhered to the surface of the paper sheet adheres to the detection roller and the reference roller, and if the roller is coated with the dust, accurate detection cannot be performed. Regarding this problem, a scraper for removing a foreign substance is disclosed in Japanese Laid-open Patent Publication No. H10-283520. However, if the scraper is secured to a part of an apparatus, even in the case of an elastic scraper, a movement of a detection roller when a banknote comes in between the rollers is blocked due to an end of the scraper, and thus accurate thickness detection cannot be performed.

Moreover, when thickness detection is performed for the entire surface of a paper sheet by arranging a plurality of detection blocks including the detection rollers in a direction orthogonal to a transport direction of the paper sheet so that the detection rollers come into contact with the entire surface of the transported paper sheet, the paper sheet bumps against all the detection rollers at a time. Therefore, the detection blocks move abruptly due to a shock thereof, and a kick appears in an acquired detection output waveform. Furthermore, there is such a problem that paper jam occurs due to a resistance when the paper sheet bumps against the detection roller.

DISCLOSURE OF INVENTION

Problem to be Solved by the Invention

The present invention has been achieved to solve the various problems mentioned above. Therefore, an object of the present invention is to provide a paper-sheet-thickness detecting device that enables thickness detection as well as detection of a taped part, without requiring fine adjustment at the time of setting a detection roller, can reduce a kick in an output waveform when a paper sheet bumps against the detection roller, and does not restrict a movement of the detection roller or a reference roller at the time of removing a foreign substance adhered to the detection roller or the reference roller.

Furthermore, conventionally, because a biasing unit for bringing the detection roller into contact with the reference roller at all times and a detector that detects a displacement of the detection roller are configured by separate members, the configuration of the detection roller is complicated. Therefore, another object of the present invention is to simplify the configuration of the detection roller by configuring the biasing unit and the detector by one member.

Means for Solving Problem

A paper-sheet-thickness detecting device according to an aspect of the present invention includes: a reference roller provided on a fixed rotation shaft and serving as a thickness reference position; a plurality of detecting units each including a detection roller, a detection block, a first pressing member, and a displacement detector, the detecting units being arranged along a fulcrum shaft of the detection block; and a holding block holds at least the fulcrum shaft. The detection roller is provided to face and come into contact with the reference roller; the detection block has a first end at which the detection roller is provided and a second end which is rotatably fixed around the fulcrum shaft so that the detection block is rotated and displaced according to a thickness of a paper sheet passing through between the reference roller and the detection roller; the first pressing member is secured to the holding block to maintain contact between the detection roller and the reference roller by pressing a part of the detection block, the first pressing member being displaced according to rotation and displacement of the detection block when the paper sheet passes through between the reference roller and the detection roller; and the displacement detector detects a displacement amount of the first pressing member in a noncontact manner.

The paper-sheet-thickness detecting device may further include a pitching suppressing unit that suppresses pitching of the detection roller by applying a thrust pressure from both ends of the fulcrum shaft. The holding block may be mounted in an upper baseplate via a compression spring and the upper baseplate may be mounted on a lower baseplate on which the rotation shaft of the reference roller is fixed.

The paper-sheet-thickness detecting device may further include a thin-plate scraper fixed to the detection block, the thin-plate scraper coming into contact with the detection roller substantially vertically to remove a foreign substance adhered to the detection roller with rotation of the detection roller. The paper-sheet-thickness detecting device may further include a resin scraper fixed to the lower baseplate via a plate spring integrally formed with the resin scraper, the resin scraper coming into contact with the reference roller with a predetermined pressure to remove a foreign substance adhered to the reference roller with rotation of the reference roller; and an opening for discharging the removed foreign substance, provided in the lower baseplate.

The detection units may include two type of detection units each having a different distance between the rotation shaft of the detection roller and the fulcrum shaft of the detection block, the two type of detection units being alternatively arranged along the fulcrum shaft, so that the detection rollers are arranged in a staggered manner in a direction of an axis of the fulcrum shaft.

BEST MODE(S) FOR CARRYING OUT THE INVENTION

A paper-sheet-thickness detecting device according to the present invention will be explained below in detail with reference to the accompanying drawings.

Figure 1:
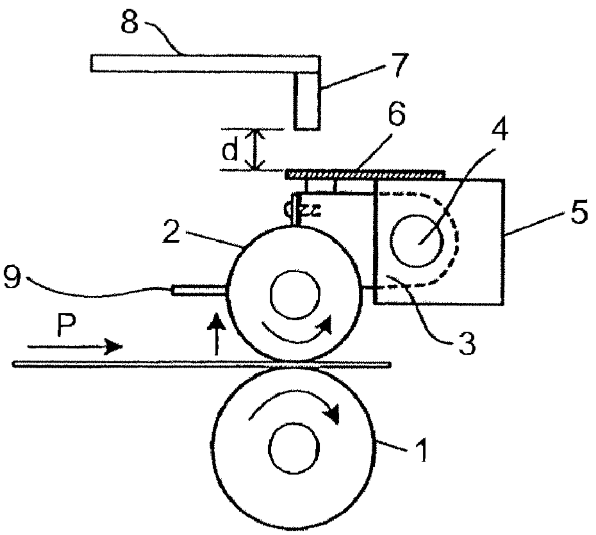
FIG. 1 is an explanatory diagram of a principle of thickness detection by a paper-sheet-thickness detecting device according to the present invention.

FIG. 1 is an explanatory diagram of a principle of thickness detection by the paper-sheet-thickness detecting device according to the present invention. The thickness detecting device includes a reference roller 1 with a rotation shaft being fixed, which serves as a reference position of thickness, a detection roller 2 provided to come into contact with the reference roller 1, a detection block 3 in which the detection roller 2 is provided at one end and the other end thereof is rotatably fixed around a fulcrum shaft 4 so that the detection block 3 is rotated and displaced in a direction of the arrow according to a thickness of the paper sheet P passing through between the reference roller 1 and the detection roller 2, a holding block 5 that holds at least the fulcrum shaft 4 of the detection block 3, a plate spring 6 made of metal and fixed to the holding block 5 to maintain contact between the detection roller 2 and the reference roller 1 by pressing a part of the detection block 3, which is pushed upward and displaced according to rotation and displacement of the detection block 3 when the paper sheet P passes through between the reference roller 1 and the detection roller 2, a displacement detector (a metal-plated displacement sensor) 7 that detects a displacement amount of the plate spring 6 in a noncontact manner, and a signal processor (a sensor board) 8 that detects the thickness of the paper sheet P based on an output signal of the displacement sensor 7.

The principle of thickness detection is simply explained. When the paper sheet P is transported and enters in between the reference roller 1 and the detection roller 2, because the rotation shaft of the reference roller 1 is secured, the detection roller is pushed upward by the thickness of the paper sheet P. Because the detection block 3 in which the detection roller 2 is mounted is rotatably supported about the fulcrum shaft 4, when the detection roller 2 moves upward, the detection block 3 also rotates upward. The plate spring 6 that contacts with the detection block 3 at all times to push the detection block 3 downward with an elastic force is displaced upward corresponding to a displacement of the detection block 3. The displacement sensor 7 outputs an electric signal as a change of distance (d) between the plate spring 6 and the displacement sensor 7, and the signal processor 8 detects it as the thickness of the paper sheet P. As the metal-plated displacement sensor, a micro displacement sensor (product name: DS2001), manufactured by Japan Systems Development Co., Ltd., can be used. A case that the plate spring 6 is made of metal is explained as an example, however, the plate spring 6 is not limited to be made of metal, and it may be made of resin. In the case of resin, a distance sensor using laser or the like can be used as the displacement sensor.

On the other hand, when the paper sheet P has passed through between the reference roller 1 and the detection roller 2, the detection block 3 is pushed downward by the elastic force of the plate spring 6, so that the reference roller 1 and the detection roller 2 comes into contact with each other again.

Figure 2:
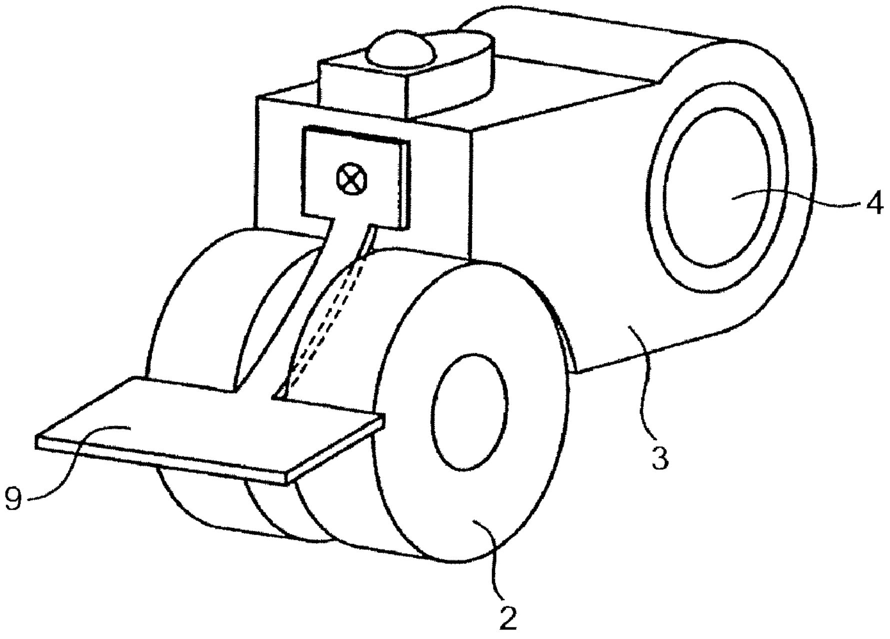
FIG. 2 is a perspective view of a detection block in which a detection roller is mounted.

FIG. 2 is a perspective view of an example of the detection block 3 in which the detection roller 2 is mounted. FIG. 2 depicts a state that a laminar scraper 9 for removing a foreign substance (a substance in which dust or the like adhered to the paper sheet is transferred to the roller) adhered to the detection roller 2 with rotation of the detection roller 2 is screwed to the detection block 3. Because the scraper 9 abuts against the detection roller 2 substantially vertically, the scraper 9 can remove the foreign substance regardless of a rotation direction of the detection roller 2.

Figure 3:
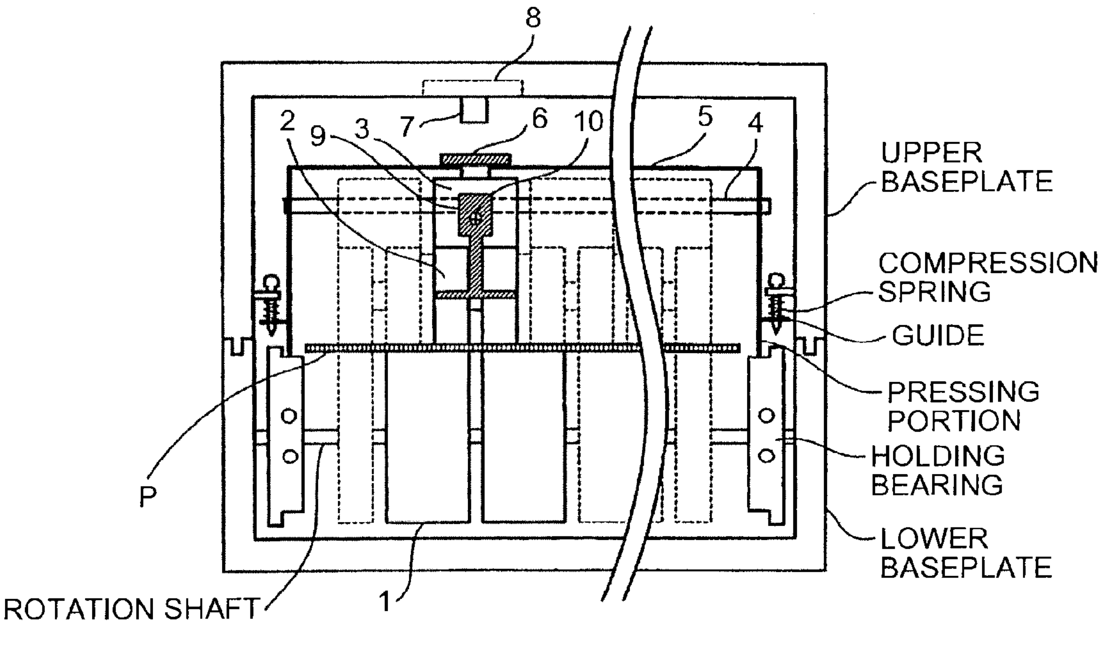
FIG. 3 is a schematic diagram of a paper-sheet-thickness detecting device in which a plurality of detecting units are arranged along a fulcrum shaft and a plurality of reference rollers are arranged along a rotation shaft.

FIG. 3 is a schematic diagram of an overall configuration of the paper-sheet-thickness detecting device in which a plurality of detecting units including the detection roller 2, the detection block 3, the plate spring 6, and the displacement detector 7 are arranged along the fulcrum shaft 4 and a plurality of reference rollers 1 are arranged along the rotation shaft. In the present embodiment, 12 of the detecting units are arranged in the direction of the fulcrum shaft, and corresponding reference rollers are arranged opposite thereto. The reference rollers do not need to be arranged in a divided manner, and can be arranged as one long roller.

The rotation shaft of the reference roller is secured to a lower baseplate, and the holding block 5 fixed with the fulcrum shaft 4 of the detection block 3 is mounted in an upper baseplate via a compression spring.

Figure 4:
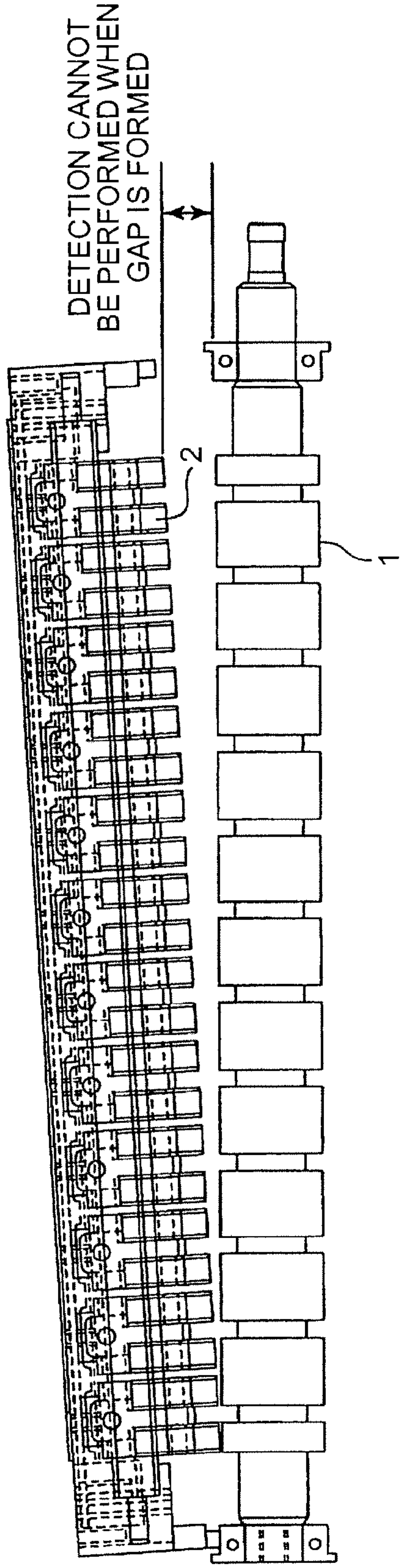
FIG. 4 depicts a state where a detection roller and a reference roller are not contacted with each other.

The reason why the holding block is mounted in the upper baseplate via the compression spring is to maintain the detection roller and the reference roller at an accurate position by pressing a pressing portion on the holding block side against a holding bearing by the compression spring to thereby prevent a situation such that the thickness detection cannot be performed when the detection roller 2 and the reference roller 1 are away from each other to form a gap therebetween due to warpage of the base plate or the like, as shown in FIG. 4.

Figure 5A:
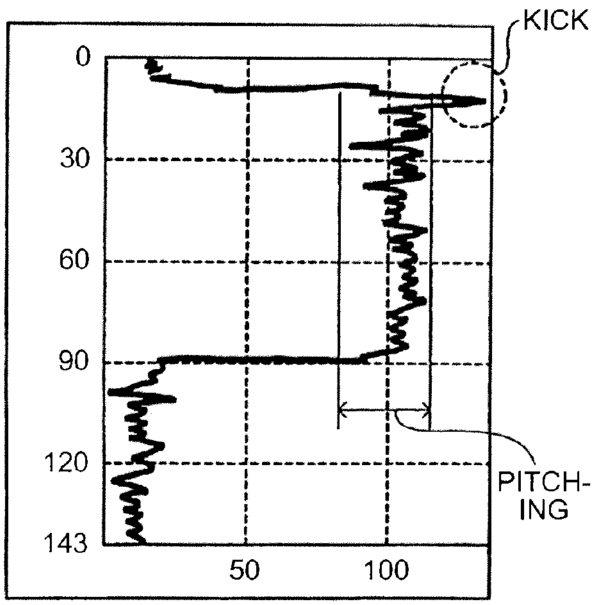
FIGS. 5A and 5B depict a comparison of output waveforms of a displacement detector (a displacement sensor).
Figure 5B:
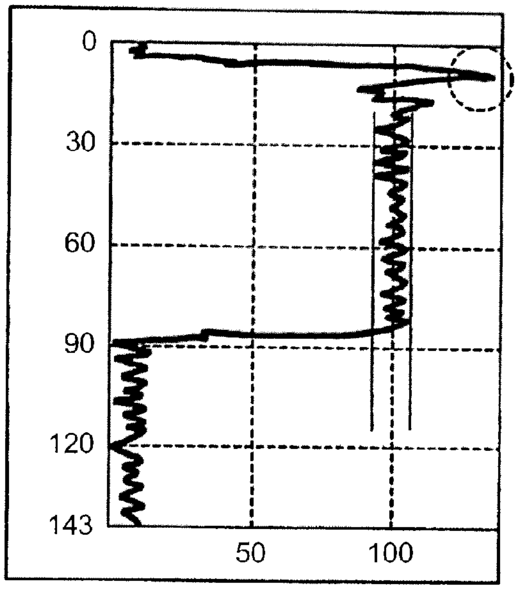
Figure 6:
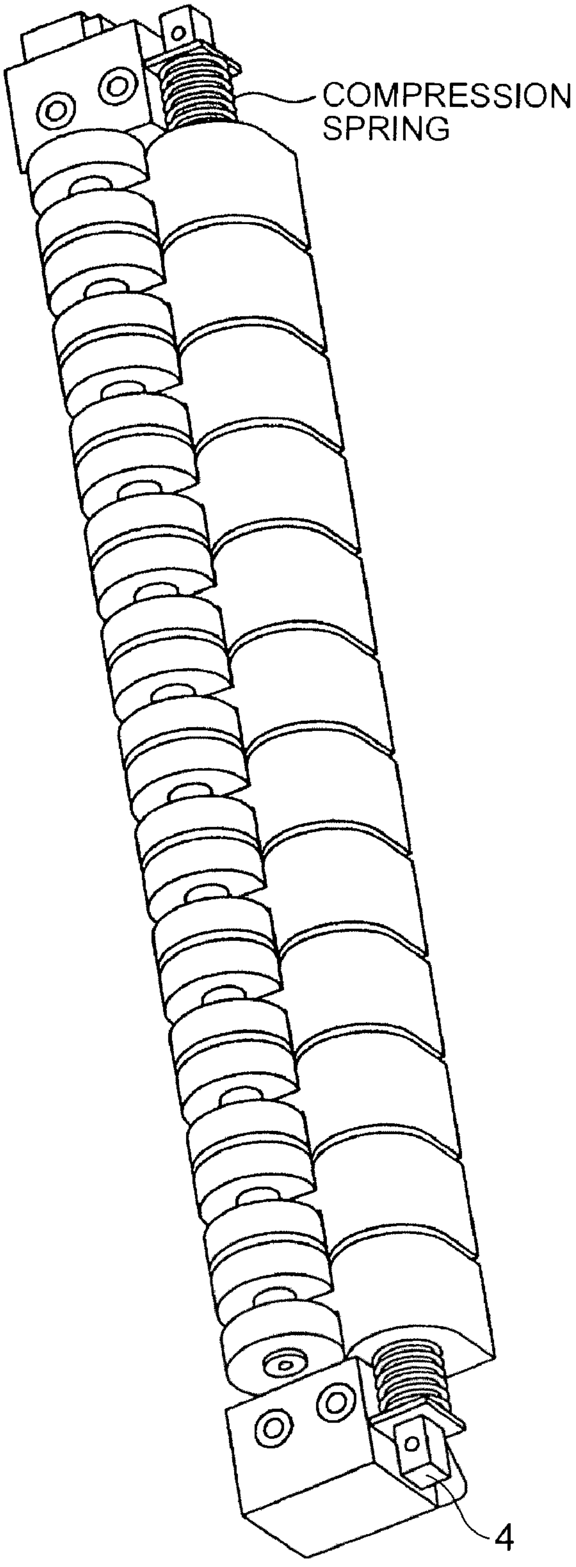
FIG. 6 depicts a state where a plurality of detection blocks in which detection rollers are mounted are aligned along a fulcrum shaft, and thrust pressures are applied from both ends of the fulcrum shaft by compression springs.

FIGS. 5A and 5B depict the output signal waveforms of the displacement sensor. The detection block 3 is pressed toward the reference roller in the opposite side thereof by the plate spring 6. However, the detection roller trembles due to rough surfaces of the paper sheet while the paper sheet passes through between the reference roller and the detection roller, thereby causing pitching in the output signal waveform of the displacement sensor (FIG. 5A). It can be considered to increase the pressing force of the plate spring for reducing pitching; however, it is not preferable because a reaction force against the holding block increases as a whole when the number of detecting units becomes larger. Therefore, it can be considered to dampen the movement of the respective detection blocks. Specifically, as shown in FIG. 6, a thrust pressure is applied from both ends of the fulcrum shaft 4 of the detection block by using the compression spring. Accordingly, the movement of the respective detection blocks is suppressed because the higher the degree of adhesion between adjacent detection blocks, the higher the frictional force. As a result, pitching can be reduced to a small waveform as shown in FIG. 5B.

Figure 7A:
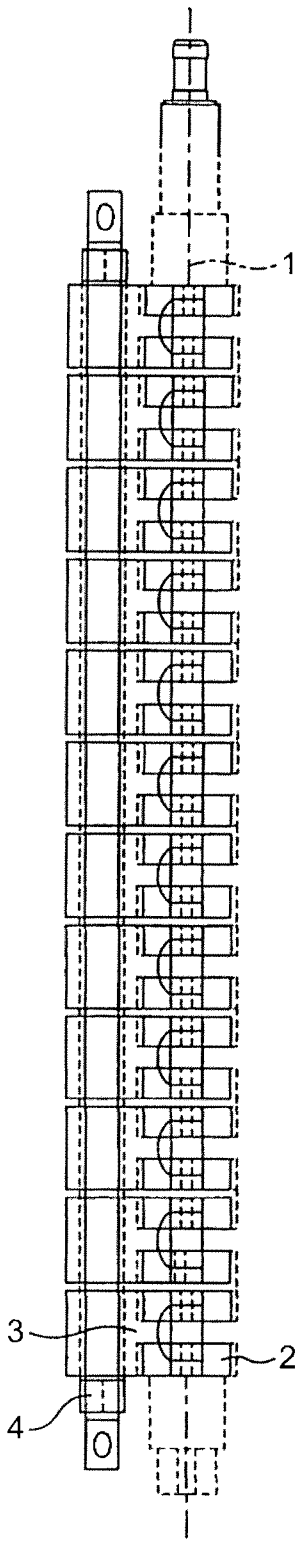
FIGS. 7A and 7B depict a paper-sheet-thickness detecting device in which two types of detection blocks having a different distance between a fulcrum shaft of the detection block and a rotation shaft of a detection roller are alternatively arranged so that detection rollers are arranged in a staggered manner.

FIG. 7A depicts a case that 12 detection blocks having the same distance between the rotation shaft of the detection roller 2 and the fulcrum shaft 4 of the detection block 3 are arranged. When the paper sheet enters in between the reference roller and the detection roller, the paper sheet bumps against 24 (12×2) detection rollers at a time. Therefore, the detection blocks fluctuate abruptly due to the shock thereof, thereby causing a kick in the output waveform of the displacement sensor (see FIGS. 5A and 5B). To reduce the kick, a method of increasing the pressing force by the plate spring 6 or increasing the thrust pressure with respect to the fulcrum shaft can be considered. However, if the pressing force of the plate spring is increased, a force of 12 times the pressing force is applied to the holding block as an entire device, thereby causing problems of strength and paper jam. Further, if the thrust pressure is increased too much, the detection blocks hardly move, thereby deteriorating detection sensitivity.

Figure 7B:
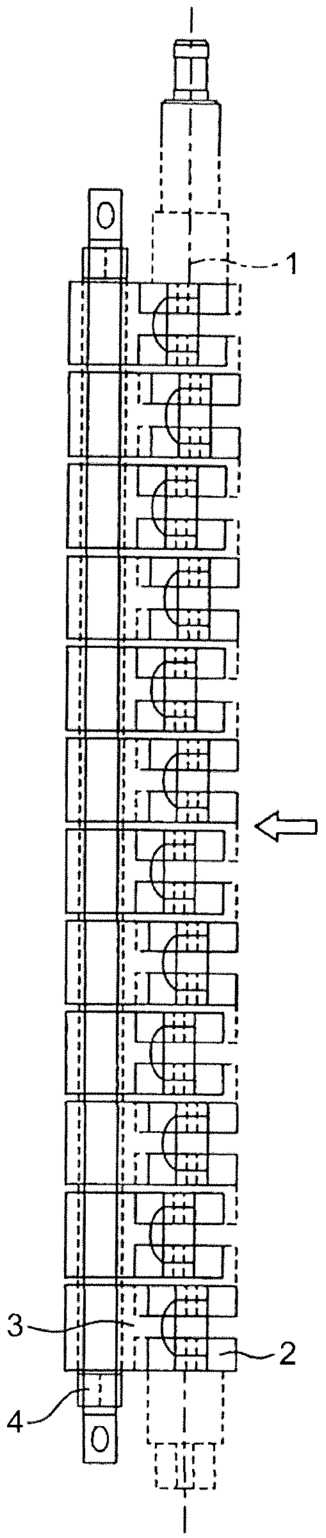

Therefore, as shown in FIG. 7B, two types of detection blocks having a different distance between the rotation shaft of the detection roller 2 and the fulcrum shaft 4 of the detection block 3 are used, these are alternatively arranged in a staggered manner (in a zig-zag manner), so that the number of detection blocks against which the paper sheet bumps at a time is decreased to reduce the shock, thereby alleviating the kick in the waveform. That is, in FIG. 7B, when the paper sheet enters from an arrow direction, the paper sheet bumps against detection rollers in detection blocks of odd number from the left along the arrow direction, and thereafter, bumps against the detection rollers in the detection blocks of even number. Therefore, the shock at the time of entrance of the paper sheet can be halved. The rotation shaft of the detection roller in the odd detection blocks and the rotation shaft of the detection roller in the even detection blocks can be arranged to be shifted by about 1 to several millimeters, respectively, before and after the rotation shaft of the reference roller.

If the two types of detection blocks are alternatively arranged in the staggered manner, as described above, a resistance force is applied evenly to the front end of the paper sheet at the time of entrance thereof, thereby enabling to prevent a skew. Further, even if the two type detection blocks are arranged in any combination in the same number as a result, there is an effect of halving the shock at the time of entrance of the paper sheet.

Further, if three or four types of detection blocks having a different distance between the rotation shaft of the detection roller 2 and the fulcrum shaft 4 of the detection block 3 are provided, the shock at the time of entrance of the paper sheet can be alleviated to one third or one fourth, respectively.

Figure 8:
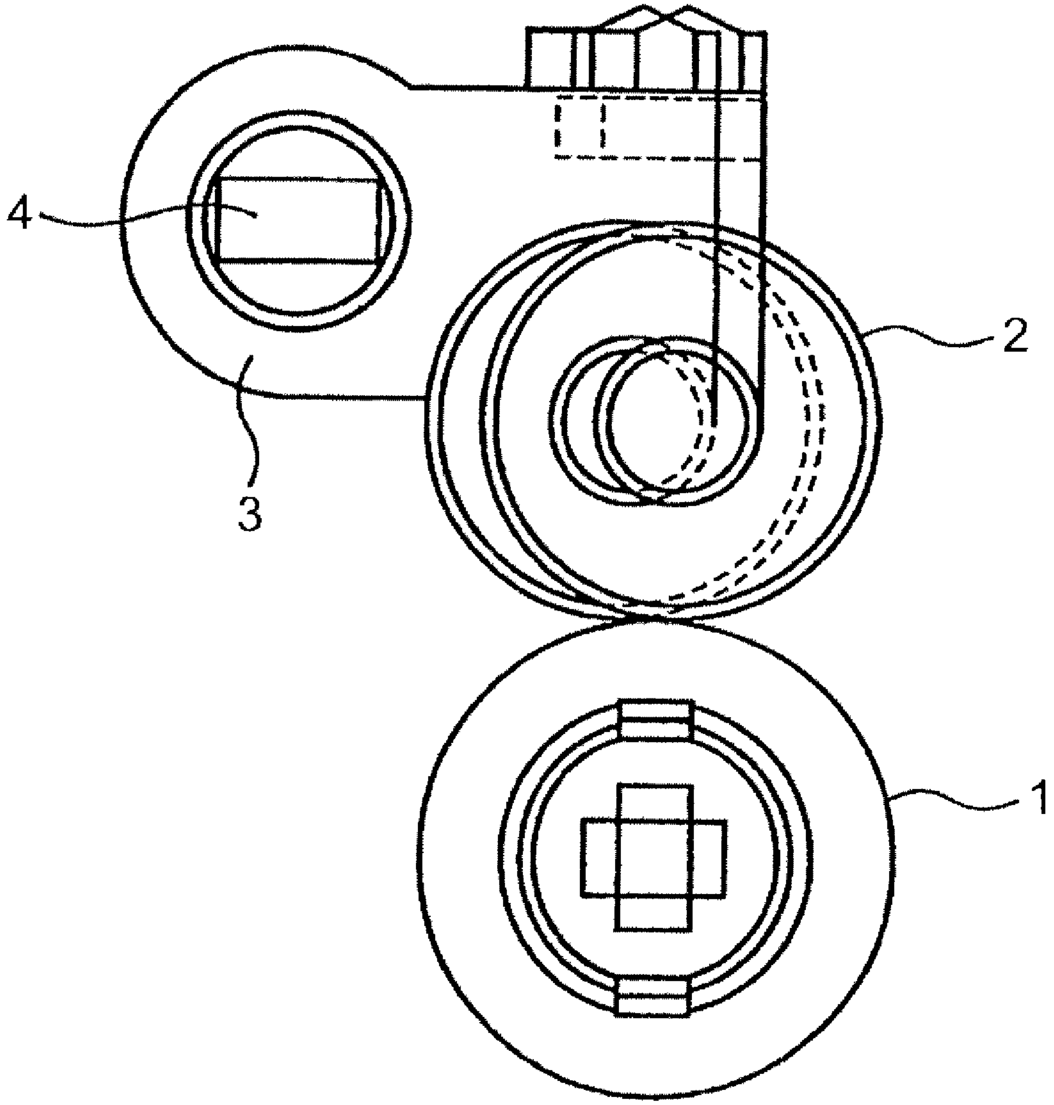
FIG. 8 depicts the mechanism of FIG. 7 as viewed from a shaft direction.

FIG. 8 depicts the configuration of FIG. 7 as viewed from a shaft direction.

Figure 9:
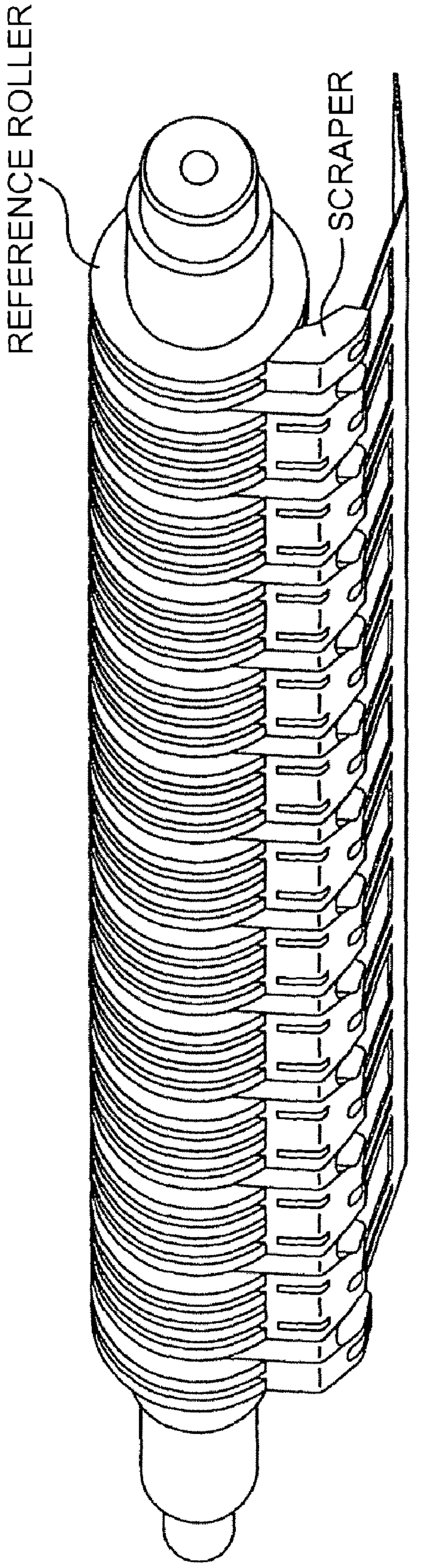
FIG. 9 depicts scrapers for removing a foreign substance, the scrapers abutting against a reference roller.

FIG. 9 depicts a state where a scraper made of resin comes into contact with the reference roller for removing a foreign substance adhered to the reference roller (dust or the like adhered to the paper sheet is transferred to the roller) with rotation of the reference roller. Because the scraper comes into contact with the reference roller with the entire surface, the foreign substance can be removed even when the reference roller rotates in any direction.

Figure 10:
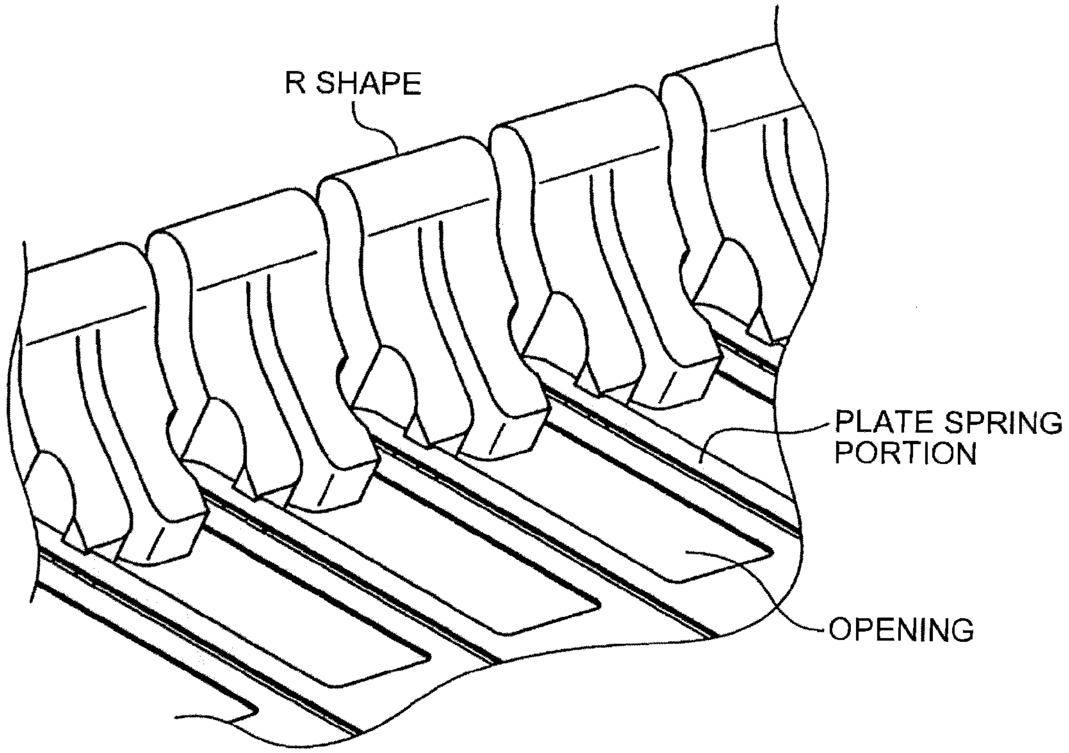
FIG. 10 is an enlarged view of the scrapers shown in FIG. 9.
Figure 11:
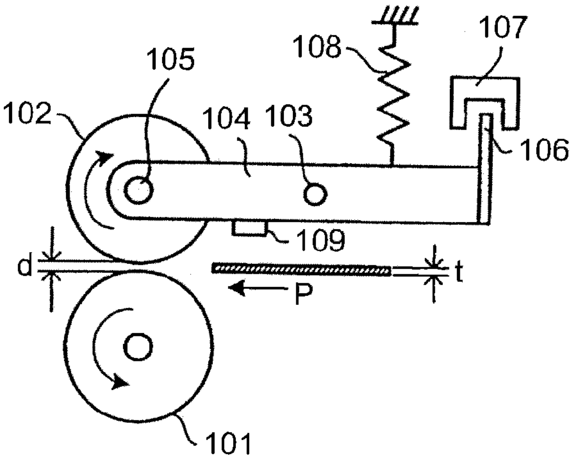
FIG. 11 is an example of a conventional paper-sheet-thickness detecting device.

FIG. 10 is an enlarged view of the scraper, in which a portion that comes into contact with the reference roller has a round shape, and an opening for cleaning off dirt is provided in a plate spring portion integrally formed with the scraper. Accordingly, the removed foreign substance is discharged to the outside of the thickness detecting device.

One end of the scraper is fixed to the lower baseplate via the plate spring. Further, because the scraper is fixed via the plate spring, even if the scraper is worn out, the scraper is not separated from the surface of the reference roller, and thus a foreign-substance removing function is not deteriorated.

Due to the scraper shown in FIG. 2 and the scraper shown in FIG. 9, foreign substance can be removed from the reference roller and the detection roller, thereby enabling accurate thickness detection.

The invention claimed is:

1. A paper-sheet-thickness detecting device, comprising:

at least one reference roller provided on a fixed rotation shaft and serving as a thickness reference position;

a plurality of detection units each including a detection roller, a detection block, a first pressing member, and a displacement detector, the detection units being arranged along a fulcrum shaft; and a holding block holding at least the fulcrum shaft, wherein the detection rollers are provided to face and come into contact with the at least one reference roller, wherein each of the detection blocks has a first end at which its corresponding detection roller is provided and a second end which is rotatably fixed around the fulcrum shaft such that the detection block is rotated and displaced according to a thickness of a paper sheet passing through between the at least one reference roller and the detection block's corresponding detection roller, wherein each of the first pressing members comprises a plate spring which is fixed to the holding block to maintain contact between the first pressing member's corresponding detection roller and the at least one reference roller by pressing a part of the first pressing member's corresponding detection block, wherein the each of the first pressing members is configured to be displaced according to turning and displacement of its corresponding detection block when the paper sheet passes through between the at least one reference roller and the first pressing member's corresponding detection roller, and wherein each of the displacement detectors is configured to detect a displacement amount of its corresponding first pressing member in a noncontact manner.

2. The paper-sheet-thickness detecting device according to claim 1, further comprising a pitching suppressing unit that suppresses pitching of each of the detection rollers by applying a thrust pressure from both ends of the fulcrum shaft to give a frictional force between adjacent detection blocks.

3. The paper-sheet-thickness detecting device according to claim 1, wherein the holding block is mounted in an upper baseplate via a compression spring, and wherein the upper baseplate is mounted on a lower baseplate to which the rotation shaft of the at least one reference roller is secured.

4. The paper-sheet-thickness detecting device according to claim 1, wherein each of the detection units further comprises a thin-plate scraper fixed to its corresponding detection block, wherein each of the thin-plate scrapers comes into contact with its corresponding detection roller substantially vertically such that a foreign substance adhered to the corresponding detection roller is removed with rotation of the corresponding detection roller.

5. The paper-sheet-thickness detecting device according to claim 3, further comprising:

a resin scraper fixed to the lower baseplate via a second plate spring integrally formed with the resin scraper, the resin scraper coming into contact with the at least one reference roller with a predetermined pressure such that a foreign substance adhered to the at least one reference roller is removed with rotation of the at least one reference roller; and an opening for discharging the removed foreign substance, provided in the lower baseplate.

6. The paper-sheet-thickness detecting device according to claim 5, wherein the resin scraper has a round-shaped end portion.

7. The paper-sheet-thickness detecting device according to claim 1, wherein the detection units comprise two types of detection units, wherein each type of detection unit has a different distance between a rotation shaft of its corresponding detection roller and the fulcrum shaft, wherein the two types of detection units are alternatively arranged along the fulcrum shaft such that the detection rollers are arranged in a staggered manner in a direction of an axis of the fulcrum shaft.

8. The paper-sheet-thickness detecting device according to claim 4, further comprising:

a resin scraper fixed to a lower baseplate via a second plate spring integrally formed with the resin scraper, the resin scraper coming into contact with the at least one reference roller with a predetermined pressure such that a foreign substance adhered to the at least one reference roller is removed with rotation of the at least one reference roller, and an opening for discharging the removed foreign substance, provided in the lower baseplate.

9. The paper-sheet-thickness detecting device according to claim 8, wherein the resin scraper has a round-shaped end portion.

10. The paper-sheet-thickness detecting device according to claim 1, wherein the at least one reference roller comprises a reference roller for each of the detection units.

11. The paper-sheet-thickness detecting device according to claim 1, wherein the at least one reference roller comprises a plurality of reference rollers.

12. A paper-sheet-thickness detecting device, comprising:

at least one reference roller provided on a fixed rotation shaft and serving as a thickness reference position;

a plurality of detection units each including a detection roller, a detection block, a first pressing member, and a displacement detector, the detection units being arranged along a fulcrum shaft; and a holding block holding at least the fulcrum shaft, wherein the detection rollers are provided to face and come into contact with the at least one reference roller, wherein each of the detection blocks has a first end at which its corresponding detection roller is provided and a second end which is rotatably fixed around the fulcrum shaft such that the detection block is rotated and displaced according to a thickness of a paper sheet passing through between the at least one reference roller and the detection block's corresponding detection roller, wherein each of the first pressing members is fixed to the holding block to maintain contact between the first pressing member's corresponding detection roller and the at least one reference roller by pressing a part of the first pressing member's corresponding detection block, wherein the each of the first pressing members is configured to be displaced according to turning and displacement of its corresponding detection block when the paper sheet passes through between the at least one reference roller and the first pressing member's corresponding detection roller, wherein each of the displacement detectors is configured to detect a displacement amount of its corresponding first pressing member in a noncontact manner, wherein the detection units comprise two types of detection units, wherein each type of detection unit has a different distance between a rotation shaft of its corresponding detection roller and the fulcrum shaft, wherein the two types of detection units are alternatively arranged along the fulcrum shaft such that the detection rollers are arranged in a staggered manner in a direction of an axis of the fulcrum shaft.

* * * * *